United States Patent
Zhdanov et al.

(10) Patent No.: US 11,048,979 B1
(45) Date of Patent: Jun. 29, 2021

(54) ACTIVE LEARNING LOOP-BASED DATA LABELING SERVICE

(71) Applicant: Amazon Technologies, Inc., Seattle, WA (US)

(72) Inventors: Fedor Zhdanov, Seattle, WA (US); Siddharth Joshi, Seattle, WA (US); Sankalp Srivastava, Seattle, WA (US); Rahul Sharma, San Jose, CA (US); Pietro Perona, Altadena, CA (US); Sindhu Chejerla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/370,706

(22) Filed: Mar. 29, 2019

Related U.S. Application Data

(60) Provisional application No. 62/770,882, filed on Nov. 23, 2018.

(51) Int. Cl.
*G06K 9/00* (2006.01)
*G06K 9/62* (2006.01)
*G06N 20/00* (2019.01)

(52) U.S. Cl.
CPC ......... *G06K 9/6262* (2013.01); *G06K 9/6257* (2013.01); *G06K 9/6259* (2013.01); *G06N 20/00* (2019.01)

(58) Field of Classification Search
CPC .. G06K 9/6262; G06K 9/6257; G06K 9/6259; G06N 20/00
See application file for complete search history.

(56) References Cited

U.S. PATENT DOCUMENTS

| | | | |
|---|---|---|---|
| 7,792,353 B2* | 9/2010 | Forman | G06N 20/00 382/159 |
| 2011/0088011 A1 | 4/2011 | Ouali | |
| 2012/0269436 A1* | 10/2012 | Mensink | G06K 9/00624 382/180 |
| 2017/0039038 A1 | 2/2017 | Huber et al. | |
| 2017/0315979 A1 | 11/2017 | Boucher et al. | |

(Continued)

OTHER PUBLICATIONS

U.S. Appl. Nos. 16/370,723, 62/770,882, Pending.

(Continued)

*Primary Examiner* — Khai M Nguyen
(74) *Attorney, Agent, or Firm* — Nicholson De Vos Webster & Elliott LLP

(57) ABSTRACT

Techniques for active learning-based data labeling are described. An active learning-based data labeling service enables a user to build and manage large, high accuracy datasets for use in various machine learning systems. Machine learning may be used to automate annotation and management of the datasets, increasing efficiency of labeling tasks and reducing the time required to perform labeling. Embodiments utilize active learning techniques to reduce the amount of a dataset that requires manual labeling. As subsets of the dataset are labeled, this label data is used to train a model which can then identify additional objects in the dataset without manual intervention. The process may continue iteratively until the model converges. This enables a dataset to be labeled without requiring each item in the dataset to be individually and manually labeled by human labelers.

20 Claims, 9 Drawing Sheets

(56) References Cited

U.S. PATENT DOCUMENTS

| | | |
|---|---|---|
| 2018/0052891 A1 | 2/2018 | Shuster et al. |
| 2019/0028431 A1 | 1/2019 | Keller et al. |
| 2019/0294881 A1 | 9/2019 | Polak et al. |
| 2020/0226431 A1* | 7/2020 | Zeiler ................ G06K 9/00664 |
| 2020/0401851 A1* | 12/2020 | Mau .................... G06K 9/6292 |

OTHER PUBLICATIONS

U.S. Appl. Nos. 16/370,733, 62/770,882, Pending.
Non-Final Rejection dated Feb. 4, 2021 for U.S. Appl. No. 16/370,733.
Non-Final Rejection dated Feb. 5, 2021 for U.S. Appl. No. 16/370,723.
Requirement for Restriction/Election, U.S. Appl. No. 16/370,723, filed Aug. 10, 2020, 7 pages.

* cited by examiner

500

CreateLabelingJob — 502
Creates and starts a labeling job using specified input/output dataset, modality, annotation task specification, workforce type.

DescribeLabelingJob — 504
Returns LabelingJob status, progress and audit fields. Also returns all parameters that were used for creating the LabelingJob. Can be used to "clone" a job by feeding the returned input fields back into the CreateLabelingJob API.

ListLabelingJobsForWorkTeam — 506
Lists labeling jobs for a specific workteam

ListLabelingJobs — 508
Paginated List API that returns "summary" objects. Very similar to ListTrainingJobs, ListHPOJobs etc.

StopLabelingJob — 510
Stops a LabelingJob. The Job transitions to "Stopping" state, followed by "Stopped" state. Stopped or Stopping jobs cannot be restarted. The job will export the current "state" and a new job can be started that picks up from that state.

*FIG. 5*

ACTIVE LEARNING LOOP-BASED DATA LABELING SERVICE

CROSS-REFERENCE TO RELATED APPLICATIONS

This application claims the benefit of U.S. Provisional Application No. 62/770,882, filed Nov. 23, 2018, which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 5 is a diagram illustrating example application programming interfaces (APIs) for active learning-based data labeling according to some embodiments.

DETAILED DESCRIPTION

Various embodiments of methods, apparatus, systems, and non-transitory computer-readable storage media for active learning-based data labeling are described. Traditional active learning techniques receive unlabeled data and identify a subset of that data to be labeled by humans. A model can be trained based on these labels and then a new subset of data can be selected to be labeled by humans. This process can continue until a very accurate model has been created which can then be used to perform inference on unlabeled datasets. Although this provides a very accurate model, it is a time consuming and expensive process.

According to some embodiments, an active learning-based data labeling service enables a user to build and manage large, high accuracy datasets for use in various machine learning systems. In various embodiments, machine learning may be used to automate annotation and management of the datasets, increasing efficiency of labeling tasks and reducing the time required to perform labeling. In the past, labeling has been performed through the brute force efforts of human labelers who are given a dataset to label and return labels (e.g., a description of objects in the dataset, words spoken, bounding boxes around objects, etc.). Embodiments utilize active learning systems to reduce the amount of a dataset that requires manual labeling. As subsets of the dataset are labeled, this label data is used to train a model which can then identify additional objects in the dataset without manual intervention. The process may continue iteratively until the model converges (e.g., identifies objects within an accuracy threshold). This enables a dataset to be labeled without requiring each item in the dataset (e.g., image, video frame, video file, audio files, audio tokens, etc.) to be individually and manually labeled by human labelers.

Embodiments perform active learning and auto-annotation to reduce the amount of data to be manually annotated. As a result, inference can be performed on the dataset in each iteration, increasing the speed at which the dataset is annotated. Embodiments increase the speed at which auto-annotation can be performed. Rather than waiting for a model to be trained to be accurate for all of the data in a dataset, the data can be iteratively auto-annotated while the model is still being trained. This enables the dataset to be quickly and accurately labeled.

Figure 1:
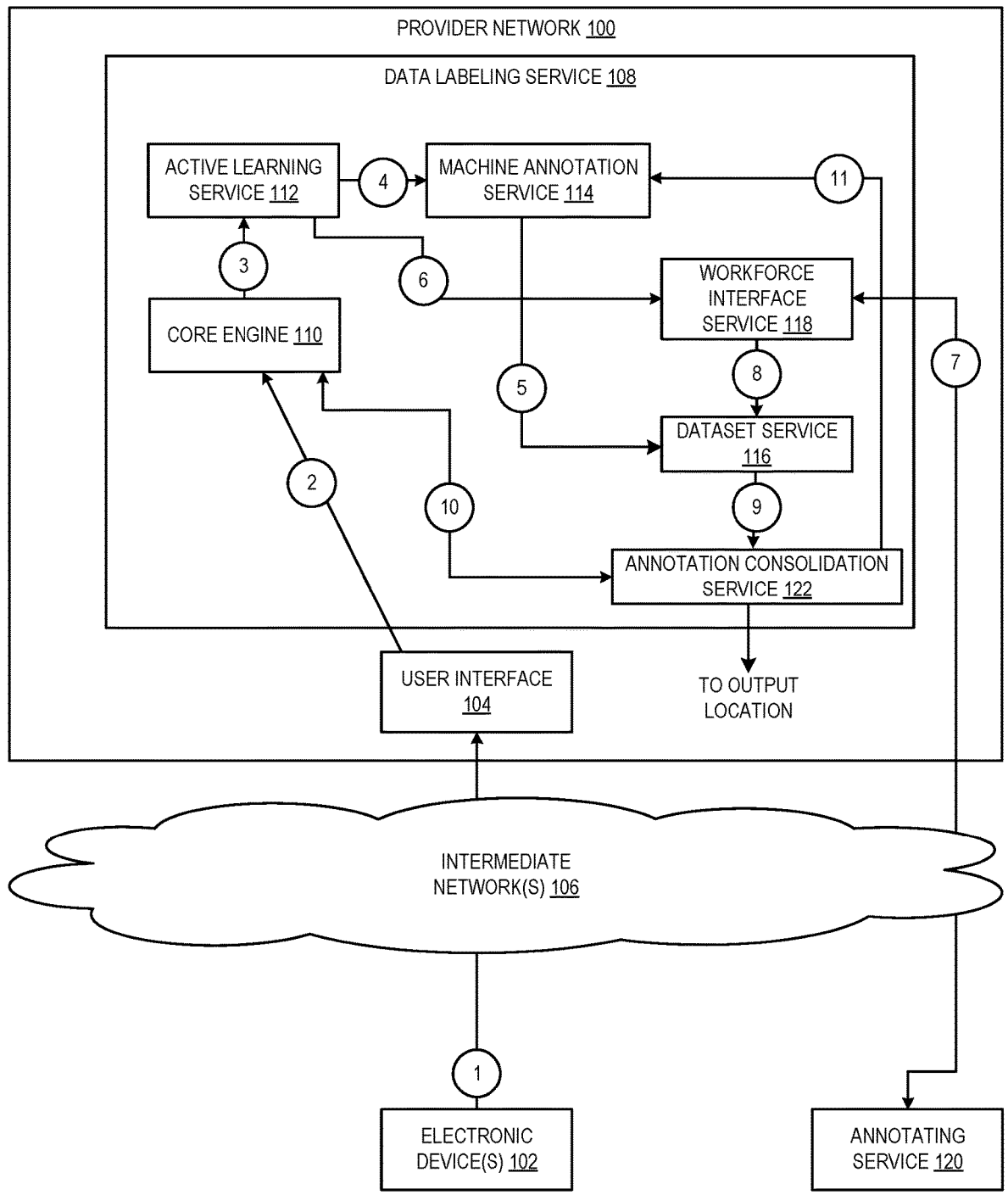
FIG. 1 is a diagram illustrating an environment for active learning-based data labeling according to some embodiments.

FIG. 1 is a diagram illustrating an environment for active learning-based data labeling according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, at numeral 1, a customer using electronic device 102 can provide access to a dataset through user interface 104. As discussed, the user interface 104 can be an API, console, or other interface. For example, the user interface 104 may be a front-end interface for data labeling service 108. Each dataset can be a collection of homogeneous pieces of data (such as image data, video data, comma separated values (CSV) files, etc.). A dataset may be a raw unlabeled dataset, a partially labeled dataset, a gold standard dataset, or a training dataset. As used herein, a gold standard dataset may refer to a dataset that has been verified as being accurately labeled. In some embodiments, the dataset may be stored in a customer-owned data store, such as an object store, database, or other data store. The customer can provide credentials to access the dataset (e.g., username and password, keys, etc.) and a location of the dataset (e.g., a Uniform Resource Locator (URL) of the dataset or another identifier of a storage location of the dataset). In some embodiments, at numeral 1, the customer may also specify one or more of a gold standard dataset, a target label space, a desired quality threshold, and an annotation budget.

Labels may be attributes of objects in a dataset. For example, labels may include a region including an object (e.g., a bounding box surrounding a particular object), the species of an animal in a picture, the words in an utterance, etc. Labels are the outputs of annotations after the annotations have been consolidated and have achieved a quality score above a given threshold. As such, as used herein, a label refers to the true underlying object property, while annotations refer to the tags or other outputs by a labeling task (e.g., by a human labeler or machine annotation).

The label space may be a sub-graph of the overall graph of predefined labels that can be used for annotations for specific dataset objects. For example, for a machine learning model to recognize species of birds, the label space includes labels (and associated label classes) for various species of birds. These labels can be either predefined (e.g., a closed label space) or incrementally defined by annotators (e.g., an open label space)

In some embodiments, the customer can specify a workflow to be used for labeling. The workflow may be provided by the active learning-based labeling service or may be a custom workflow specified by the user. Each workflow can be a nested workflow comprising a series of steps corresponding to one or more of active learning, machine annotating, manual annotating, annotation consolidation and quality score computation, model training, and then outputting of training datasets and/or models.

At numeral 2, the various properties described above that are received from the customer may be provided to the core engine 110. The core engine 110 drives the overall workflow definition, execution, monitoring, and orchestration behind the execution of multiple concurrent labeling workflows executed by the data labeling service 108. The core engine 110 is responsible for triggering/calling functions, activities and tasks on multiple different microservices as part of the overall execution of a workflow. The core engine may also maintain the state (in a multi-tenanted manner) related to the execution of workflows and associated annotation tasks for multiple customers.

At numeral 3, when the workflow is started, the dataset specified by the customer can be provided to active learning service 112 ("ALS"). ALS 112 may implement one or more active learning techniques as are known in the art. In some embodiments, the active learning technique used may depend on the type of data in the dataset (e.g., image data, audio data, video data, etc.). Additionally, the active learning techniques used may be specified by the customer in a custom workflow or may be built-in as part of data labeling service 108. The ALS 112 manages the selection of dataset objects that are to be auto-labeled and the selection of dataset objects that are to be manually labeled.

Active learning is a machine learning procedure that can be useful in reducing the amount of annotated data required to achieve a target performance. Active learning starts by incrementally training a model with a small, labeled dataset and then applying this model to the unlabeled data. For each unlabeled sample, ALS 112 estimates whether this sample includes information that has not been learned by the model. An example of an active learning technique is to train an object detection model that takes an image as input and outputs a set of bounding boxes. To train such an object detection model, the training and validation images of the detector are annotated with a bounding box per object and its category. Such a technique may start with a small training set of annotated images to train a baseline object detector. In order to improve the detector by training with more images, this technique continues to collect images to annotate. Rather than annotating all newly collected images, based on different characteristics of the current detector, the ALS 112 can select a subset of the images to be manually labeled. Once annotated, these selected images are added to the training set to incrementally train the object detection model. The entire process continues to collect more images, select a subset with respect to the object detector, annotate the selected ones with humans, incrementally train the detector and so on. Other data, such as video data, audio data, etc. may also be used in such a system.

ALS 112 can perform active learning for unlabeled or partially unlabeled datasets and use machine learning to evaluate unlabeled raw datasets and provide input into the data labeling process by identifying a subset of the input data to be labeled by manual labelers. In some embodiments, ALS 112 randomly selects a sample of the input dataset for labeling. In some embodiments, ALS 112 selects the subset of the dataset using uncertainty sampling. In this example, a model used by the ALS 112 preferentially selects examples for which the model produces a low confidence of identification. Other approaches may include representativeness-based sampling where the model selects a diverse set that represent the input dataset while limiting redundancy among the subset.

Once a subset of the input dataset is identified to be auto-labeled, the subset may be annotated. For example, in some embodiments, the subset may be sent to machine annotation service 114, as shown at numeral 4. Machine annotation service 114 may use an existing model that has been trained on the same or similar labelspace which is selected for the input dataset. These machine annotations may be output to a dataset service 116 at numeral 5. In some embodiments, dataset service 116 can communicate with WIS 118, machine annotation service 114, and core engine 110 to manage the flow of data to be labeled by data labeling service 108 and to manage the resulting labels for the data generated by data labeling service 108. Additionally, or alternatively, at numeral 6, the subset identified by the ALS 112 to be manually annotated can be sent to a workforce interface service 118 ("WIS"). The WIS 118 can interface with various manual annotators including crowdsource annotators, private (e.g., in-house) annotators, and/or annotating service providers (collectively annotating service 120). The type and/or variety of labelers may be selected by the customer when starting a new labeling workflow, as discussed above. WIS 118 can present the subset of the input dataset to the selected annotating service 120 at numeral 7. The subset may then be annotated by the selected annotators and the annotations may be returned to WIS 118. These annotations may be stored in dataset service 116 at numeral 8.

Once annotations have been received from the WIS 118 and optionally from machine annotation service 114, the annotations can be consolidated into labels by annotation consolidation service 122, as shown at numeral 9. Annotation consolidation may refer to the process of taking annotations from multiple annotators (e.g., humans and/or machines) and consolidating these together (e.g., using majority-consensus heuristics, removing bias or low-quality annotators, using probabilistic distribution that minimizes a risk function for observed, predicted and true labels, or other techniques). For example, based on each annotators' accuracy history, their annotations can be weighted. If one annotator has a 50% accurate history, their annotations may have a lower weight than another annotator with a 100% accurate history.

In some embodiments, the annotation consolidation service 122 can maintain a label score and a worker score when performing annotation consolidation. During consolidation, annotation consolidation service 122 can fetch current label scores for each piece of data in the dataset (e.g., image, video frame, audio utterance, etc.) and current worker scores for the annotator who provided the annotations on that piece of data. A new label score and worker scores can be computed for the piece of data based on previous state and currently received new annotation. The label score can be compared to a specified threshold. If the label score is higher than the threshold then no additional annotations are required. If the label score is lower than the threshold then the data may be passed to additional annotators to be further annotated by annotating service 120. At numeral 10, once the label score is higher than the threshold, then the core engine 110 can be updated to indicate that the subset of the input dataset has been labeled. The active learning loop may continue to execute with the core engine invoking the active learning service 112 to label a new subset of the input dataset that is still unlabeled or partially labeled. The annotation consolidation service can output the labeled subset of the input dataset to an output location, as discussed further below.

In some embodiments, the labeled subset of the input dataset can be used to train the active learning service model. As shown at numeral 11, the labeled subset of the input dataset can be provided to the machine annotation service 114. The machine annotation service 114 may include a training service that can generate a new model, or update the previously used model, using the labeled subset of the input dataset. In some embodiments, a separate training service (not shown) may obtain the labeled subset of the input dataset from the annotation consolidation service and may use the labeled subset of the input dataset to further train the model maintained by the machine annotation service 114. The above described process may then be repeated using the updated model. For example, if the updated model has converged, then the remainder of the input dataset can be accurately identified. If the updated model has not converged, then a new subset of the input dataset can be identified for further labeling according to the process described above. In some embodiments, the data labeling service 108 can output one or more of the converged model or the labeled dataset, as described further below.

In some embodiments, the data labeling service 108 may also output various performance metrics, such as performance against the annotation budget, quality score of annotated labels and performance against the defined quality threshold, logs and metrics in a monitoring dashboard, and/or an audit trail of annotations tasks as performed by annotators. The quality score can be a numerically computed value to measure the quality of consolidated labels. This score is compared to a desired quality threshold (which may be a default value or may be provided by the customer as an input) to determine whether consolidated labels have achieved the desired quality level and hence are considered trained labels. This quality score can be expressed as an output of a risk function on a probability distribution for real, true and predicted labels.

In various embodiments, a customer can provide an unlabeled dataset which they would like to label. They might also bring a pre-trained supervised machine learning model, as well as some data which has already been labeled in the past. These inputs are fed into the data labeling service. The first step of the service is to prepare for the main loop. The preparation produces a validation dataset, a first pre-trained machine learning model, and first estimates of the quality of every worker in the pool. Then the main loop runs, and produces the final model, as well as the fully labeled dataset, with labels for every object of the original unlabeled data, as well as final worker quality estimates.

Before starting the loop, the data labeling service can prepare data for it. The preparation step returns validation data, pretrained model, and worker quality estimate. First, a random subset of the unlabeled dataset is selected for validation and sent to human annotators. During all of the human annotation processes, worker quality is estimated. There are a few options for the start of the loop. If the customer brings a pre-trained model, it can be passed along to the main loop. If there is no pretrained model, but there is some prelabeled data, this data is used to train a default model for the selected modality. Even if the labels are not very reliable, prelabeled data can be used to train the model, as training can often be resilient to some noise in the data. It is not assumed that the prelabeled data is representative of the unlabeled dataset, and thus the data labeling service still constructs the validation set. Prelabeled data might have very reliable labels, in which case it can be identified as a Gold Standard dataset, representing true labels and which can be used to help estimate the quality of the human annotations, and individual worker accuracy.

The main loop starts by running inference with the model on the validation dataset. After that, every object is given a confidence level. For example, for image classification, a confidence level can be the probability that the model predicts for the most confident class. A threshold is found, such that for the objects whose model confidence is above the threshold, the expected quality of the label provided by the model exceeds a required quality value provided by the customer. Then, the inference on the unlabeled data is performed, and the threshold is applied on the resulting inferences. All objects with the confidence larger than the threshold get auto-annotated and put into the labeled dataset. For the rest of the objects, active learning is performed to identify a subset of the objects which potentially benefit the model most. Active learning may be executed in a separate active learning loop that iteratively labels portions of the unlabeled dataset and trains the model to better auto-label the dataset, as described herein. This batch of objects is sent for human annotation. During human annotation, previously-found worker quality parameters are used, and adjusted with the new information from their annotations of the new objects. Human labels for these objects are fed into the labeled dataset. All previously human-labeled objects are then used to train a new version of the supervised model, and the loop repeats until all the data is labeled. Then, the labeled dataset is returned to the customer, along with the last model which was trained.

Figure 2:
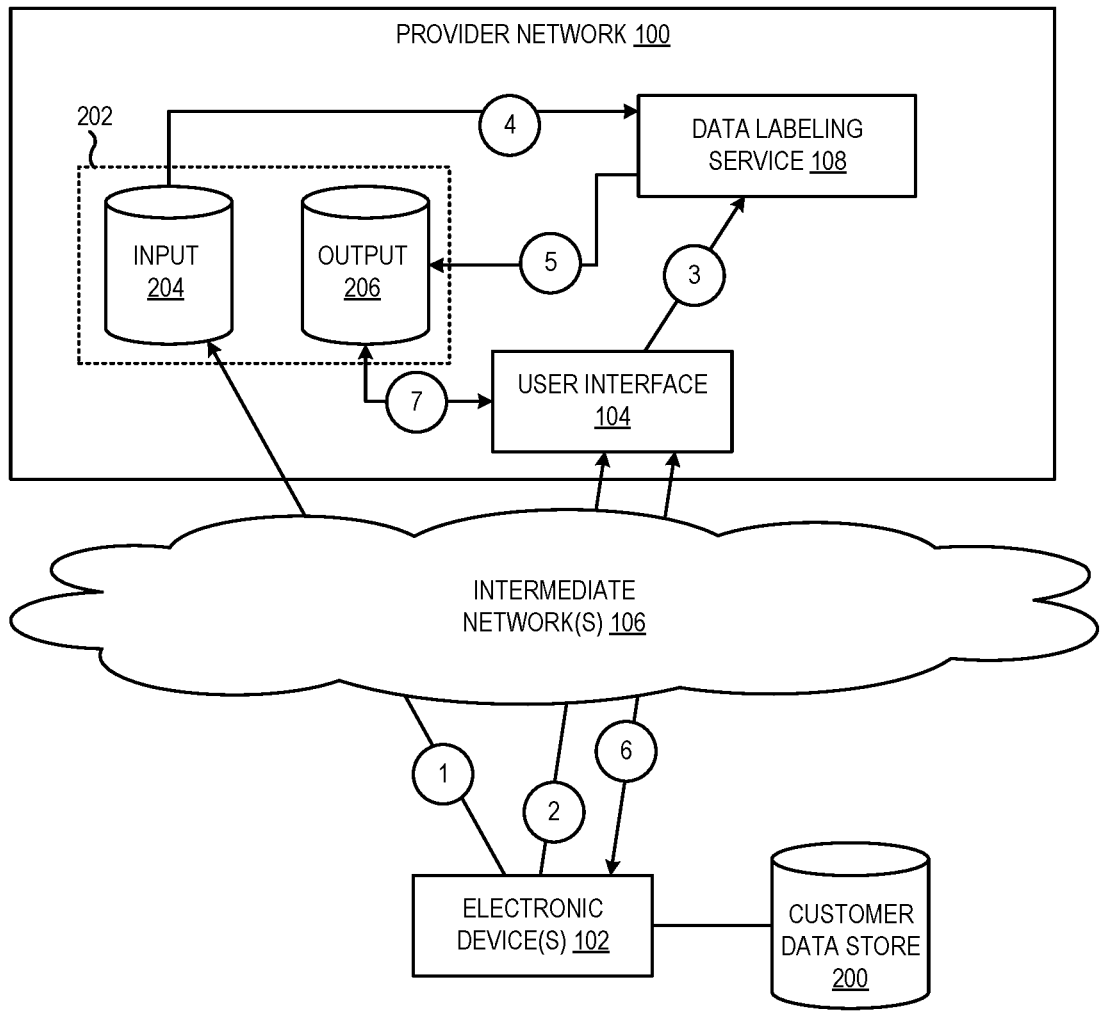
FIG. 2 is a diagram illustrating an environment for providing datasets to an active learning-based data labeling service and receiving outputs of the active learning-based data labeling service according to some embodiments.

FIG. 2 is a diagram illustrating an environment for providing datasets to an active learning-based data labeling service and receiving outputs of the active learning-based data labeling service according to some embodiments. As shown in FIG. 2, a customer can maintain their own customer data store 200 which includes one or more customer datasets. These may include unlabeled or partially labeled datasets to be provided to data labeling service 108. At numeral 1, the customer (via one or more electronic devices 102) can upload an input dataset to input data store 204. Input data store 204 and output data store 206 may be virtualized data stores 202 provided by a storage service in provider network 100. The storage service may provide object storage, block storage, database storage, or other virtualized storage services. At numeral 2, as discussed above, the customer can provide access information and/or credentials for the input dataset in input data store 204 through a user interface 104. This may include providing a URL for input data store 204 and credentials for accessing the data store. In some embodiments, the customer may establish permissions to allow the data labeling service 108 to access the input dataset. The user interface 104 can pass the information to data labeling service 108 at numeral 3.

At numeral 4, data labeling service 108 can retrieve the input dataset from the input data store 204 and perform active learning-based labeling, as discussed above with respect to FIG. 1. Data labeling service 108 can perform the above described workflow in nested fashion until the active learning model converges. The resulting labeled dataset and/or the converged model can then be output to output data store 206, at numeral 5. Both input and output data stores 204, 206 may be owned by the customer. Any intermediate state data generated for the input dataset by data labeling service 108 can be destroyed, with no durable copies of the labels or input dataset maintained by the data labeling service 108. Thus, the customer's data is labeled and ownership of the dataset and labels is retained by the customer. In some embodiments, the user can access the output data store 206 via user interface 104. For example, the user can send a request to view, download, transfer, etc. the labeled dataset in output data store 206 to user interface 104 at numeral 6. The user interface 104 can obtain the requested labeled dataset or portion thereof at numeral 7 and provide the requested labeled dataset to the user. In some embodiments, the user may access the output data store 206 through a separate user interface (e.g., provided by a storage service that is providing the output data store 206, a local file system, or other interface based on the implementation of the output data store).

In some embodiments, the dataset may include a manifest file which describes dataset properties and records. A record may include named attributes, including metadata such as image size, or labels such as "dog" or "cat". Other attributes may include raw data which needs labeling, such as image or sentences in natural language processing (NLP). In some embodiments, a manifest file for a dataset may be generated automatically by extracting metadata from files in the input data store 204 and generating the manifest file based on the metadata. In some embodiments, the output dataset stored in output data store 206 may be an updated version of the input dataset, which has been updated by combining the input dataset with the generated labels as a new dataset.

Figure 3:
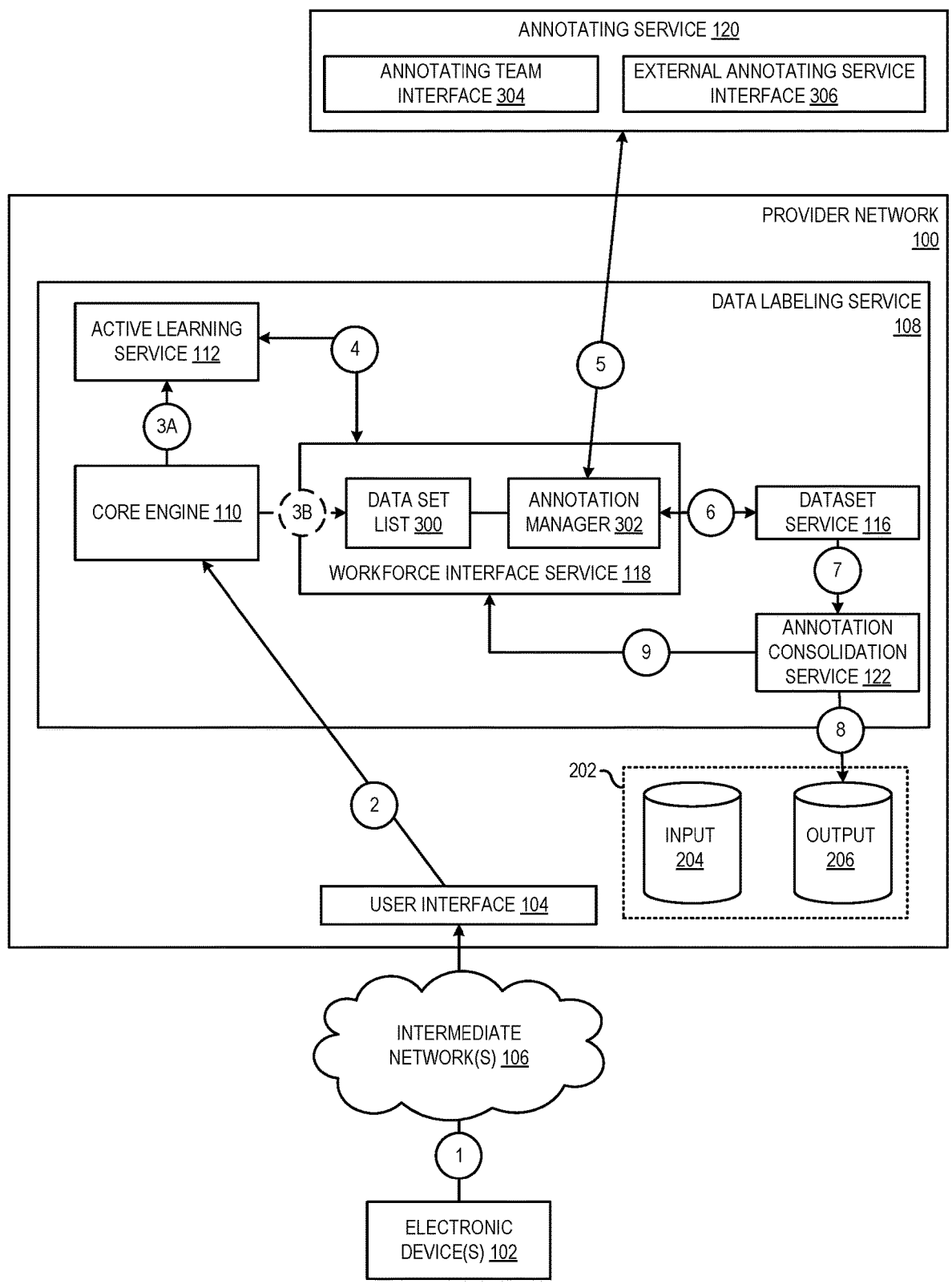
FIG. 3 is a diagram illustrating an environment for active learning-based data labeling using external workforces according to some embodiments.

FIG. 3 is a diagram illustrating an environment for active learning-based data labeling using external workforces according to some embodiments. As shown in FIG. 3, a customer can create a new labeling job at numeral 1 by sending job details (e.g., input dataset information, credentials, quality threshold, etc.) to user interface 104. At numeral 2, user interface 104 can submit the new labeling job to the core engine 110. In some embodiments, the new labeling job can be submitted to the core engine 110 when the customer submits a start workflow command to the user interface. As described above, the core engine 110 can orchestrate the workflow across various components of data labeling service 108. For example, at numeral 3A, the core engine 110 can provide the input dataset to active learning service 112. Active learning service 112, as described above, can determine a subset of the input dataset to be labeled, either manually or by a machine annotation service. Optionally, in some embodiments, the core engine 110 may provide all or a portion of the input dataset to the workforce interface service as shown at 3B. For example, the active learning service 112 can be bypassed on a first iteration of the active learning loop and a random sample of the input dataset can be provided to the workforce interface service 118 to be labeled. In subsequent iterations, all or a portion of the remaining unlabeled input dataset can be passed to the active learning service 112 to use active learning to increase the speed at which the input dataset is labeled.

At numeral 4, the active learning service 112 can pass the subset identified by the active learning service 112 to be manually annotated to WIS 118. As shown, WIS 118 may include a dataset list 300, which includes each object of the dataset (e.g., image file, text file, video file, video frame, audio utterance, etc.). For each object of the dataset, an annotation manager 302 can create a workflow for annotating service 120 to perform and pass the subset to the annotation service at numeral 5. Annotating service 120, as described above, may enable various workforces to perform annotation of the dataset. For example, annotating service 120 may include an annotating team interface 304, which provides the dataset for annotation to an internal team of annotators, and an external annotating service interface 306, which provides the dataset for annotation to an external annotation team or service such as a third-party annotation vendor. In various embodiments, the dataset may be encrypted prior to it being submitted to an annotation team or service, to protect the dataset while in transit.

The annotated datasets may be returned from the annotators to the annotation manager 302. The annotation manager 302 can output the annotated datasets to dataset service 116 at numeral 6. As discussed above, dataset service 116 can store annotated datasets received from manually annotators and auto-annotated datasets annotated by a machine annotator. At numeral 7, annotation consolidation service 122 can perform annotation consolidation on the annotated datasets. The annotation consolidation service 122 can determine a consolidated annotation (e.g., label) and quality score for each annotated object in the annotated datasets. If the annotation threshold has been reached, the annotation consolidation service 122 can store the resulting labels to output data store 206 at numeral 8.

If the threshold has not been reached, then at numeral 9, the annotation consolidation service can send a request to the annotation manager 302 to extend the annotation workflow execution. This may include requesting a configurable number of additional annotators annotate the dataset. The number of additional annotators may be determined based on the difference between the desired quality threshold and the current threshold. This may continue to loop (e.g., operations depicted as numerals 5-9) for each object of the dataset until all objects of the dataset have been annotated and determined to have a quality score higher than the threshold value.

Figure 4:
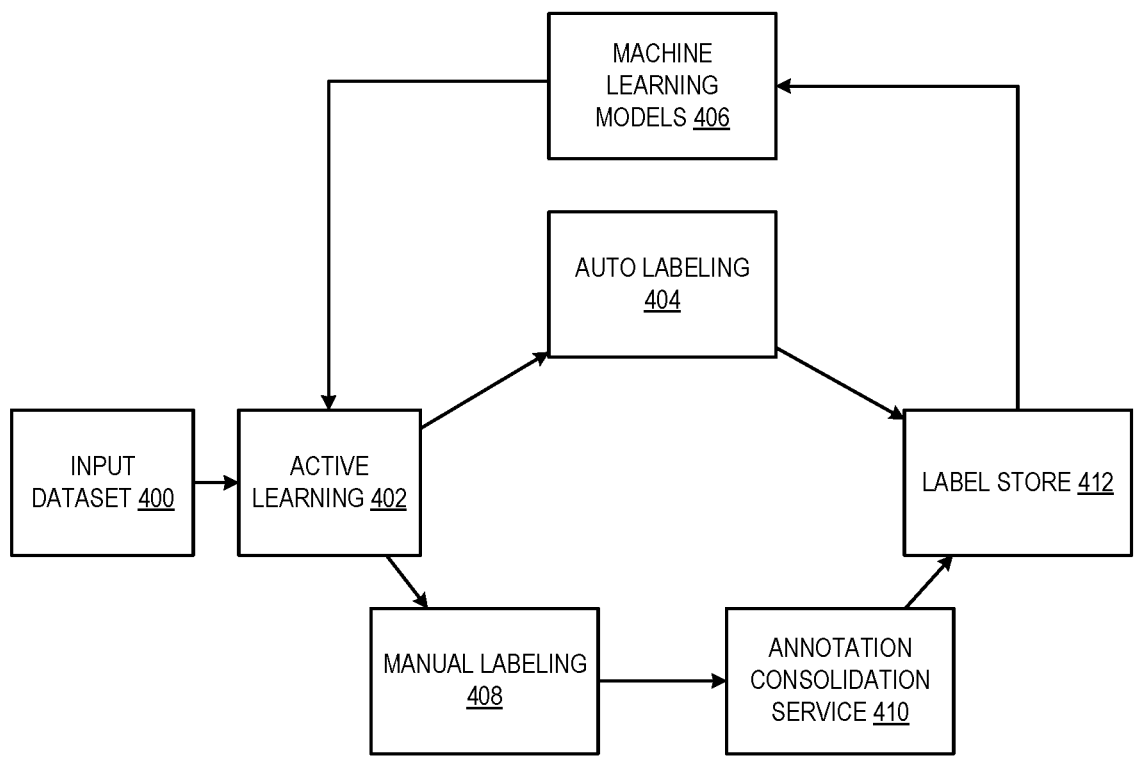
FIG. 4 is a diagram illustrating an active learning loop according to some embodiments.

FIG. 4 is a diagram illustrating an active learning loop according to some embodiments. As shown in FIG. 4, an input dataset 400 can be provided to an active learning service 402 (such as data labeling service 108). Active learning service 402 can use one or more active learning algorithms and one or more machine learning models 406 to determine a portion of the dataset to be auto-annotated and a portion of the dataset to be manually annotated. For example, the dataset can be passed through a machine learning model 406 to identify features of the dataset. Depending on the application, the machine learning model may perform classification, segmentation, object detection, etc. The machine learning model can output a confidence score for the feature it is trained to identify in each item of data in the dataset (e.g., each image in an image dataset, each word in a text dataset, etc.). A threshold can be set above which auto-annotation can be performed with an acceptable level of accuracy.

In some embodiments, in addition to the thresholding, a statistical analysis of the model can be performed to determine confidence bounds associated with the model. For example, a validation dataset, which includes known features, can be passed through the model. Because the features of the validation dataset are known, the accuracy of the model can be evaluated. The confidence scores output for each feature in the dataset can be arranged from the least to the most confidence. The accuracy of subsets of the dataset can then be evaluated. For example, the accuracy of each decile of the outputs can be determined. This results in a chart that shows you the confidence scores grouped by decile (or other subset) on the X axis and the Y axis shows you the accuracy for that decile. A regression, such as Gaussian Process Regression, can be performed to obtain a smooth curve based on the accuracy of each subset. As a result, each confidence score has a corresponding accuracy value on the smooth curve and corresponding confidence bounds for that accuracy.

The threshold can then be determined based on a user's choice of acceptable accuracy. Features identified with a confidence score with a corresponding accuracy above the threshold can be auto-labeled 404 with the labels generated by the machine learning model 406. The resulting annotations can be stored in label store 412. Features identified with a confidence score below a threshold may be sent by active learning service 402 to be manually labeled 408. As discussed above, manual labeling 408 can include sending a subset of the unlabeled dataset to a workforce interface service which may interface with one or more types of manual annotators. The manual annotators may return annotations for one or more features of the unlabeled dataset. These annotations may then be consolidated into labels by annotation consolidation service 410. For example, a feature depicted in an image may receive a plurality of annotations from a plurality of annotators. These annotations may be consolidated based on, e.g., the accuracy of the annotator and other factors, as discussed above. Once the annotations have been consolidated into labels, the labeled dataset can be output to label store 412.

As shown in FIG. 4, the active learning loop can be performed iteratively, incrementally training a more accurate machine learning model and incrementally auto-annotating a larger portion of the input dataset 400. This provides an at least partially trained model 406 in case the system crashes. Additionally, rather than waiting for the model to be completely trained before performing inference on the input dataset, by iteratively performing inference on the dataset a much larger portion of the dataset will have been annotated in the event of a system failure, resulting in a larger labeled dataset 412. Additionally, by having multiple models at different levels of training analyze the data, more accurate auto-annotations can be performed.

In some embodiments, inference can be performed in batches while iteratively training the machine learning model. This incremental training and inference allows each iteration to build on the last, increasing the speed at which inference can be performed and improving the accuracy of the model with each iteration.

In some embodiments, accuracy metrics may be maintained for each item in a dataset. For example, when identifying bounding boxes in computer vision use cases, an accuracy metric can be identified for all of the bounding boxes identified in the entire dataset. In some embodiments, an accuracy metric can be identified for each bounding box in each image in the dataset and stored. Accuracy thresholding can then be computed by retrieving the metric from storage and aggregating the metrics across a subset of the dataset, based on the confidence score for each bounding box (as described above). In some embodiments the metric may be an intersection over union (IoU) metric for each bounding box.

As noted above, a validation dataset may be used to determine an accuracy threshold to be used to determine when to auto-annotate and when to manually annotate. The validation dataset may be a portion of the input dataset (e.g., 5 or 10%). Which can be manually labeled to provide ground truth labels for the validation set. The model may be initially trained using this dataset and the accuracy of the results of inference on the input dataset using the incrementally trained model can be evaluated using the validation dataset. However, over multiple iterations, the distribution of the input dataset to be labeled and the validation dataset may become out of sync, making the results of the auto-annotation appear less accurate than they actually are.

For example, as shown in FIG. 4, active learning service 402 can pass a portion of the input dataset to auto labeling service 4504 to be auto labeled. This portion of the input dataset may include data items (e.g., images, videos, text portions, etc.) that have confidence scores above a threshold based on the current machine learning model, or a sampling of those data items. The auto labeling service 404 can use the current machine learning model to label the portion of the dataset and add it to the labeled dataset 412. Additionally, in some embodiments, a second portion of the input dataset can be sent to manual labeling service 408 to be annotated by one or more human annotators. The second portion of the input dataset may include those data items that have a confidence score below a second threshold, indicating that the current machine learning model cannot confidently label the features, or a sampling of such data items. The resulting labels can be consolidated 410 and added to the labeled dataset 412. Using the new labeled portions of the input dataset, the machine learning model can be further trained. This active learning loop may then be repeated on new portions of the input dataset, with each iteration adding to the labeled dataset and further training the model, until the input dataset has been labeled.

As each portion of the input dataset is labeled, the unlabeled portion of the input dataset becomes skewed compared to the initial validation dataset. For example, as more of the input dataset is auto-labeled, the unlabeled portion of the input dataset becomes relatively more difficult to label (as it includes a higher proportion of items with lower confidence scores). Accordingly, the validation dataset can be similarly sampled to match the current state of the unlabeled portion of the input dataset. At each iteration of the active learning loop, the validation set for that iteration is different. As iterations progress, a corresponding portion of the validation set having confidence values above the auto-labeling threshold or below the manual labeling threshold in use for the active learning loop can also be removed from the validation dataset. This way the statistical distribution of data items in the unlabeled portion of the input dataset matches the statistical distribution of data items in the validation dataset.

FIG. 5 is a diagram illustrating example application programming interfaces (APIs) 500 for active learning-based data labeling according to some embodiments. As shown in FIG. 5, the example APIs 500 may include a CreateLabelingJob 502 command which may receive a dataset URL or other identifier, a dataset type (e.g., raw, partially labeled, gold standard, etc.), a quality threshold, and an annotation budget. The CreateLabelingJob command can cause a new labeling project to be created and coordinated by the core engine of the training dataset management service. The API 500 may further include a DescribeLabelingJob command 504 which may receive a customer ID and return projects associated with that customer ID. The projects may include currently pending projects and/or completed projects. The API 500 may further include a ListLabelingJobsForWorkTeam command 506 which may return all labeling jobs associated with a workteam identifier. In some embodiments, the API 500 may further include a ListLabelingJobs command 508 that may return objects representing current labeling jobs (e.g., pending labeling jobs). In some embodiments, the API 500 may further include a StopLabelingJob command 510 that may receive an identifier associated with a labeling job and stops execution of the labeling job. In some embodiments, the API 500 may also include a start labeling job command that may cause the core engine to start a labeling workflow for a given project.

In some embodiments, the API 500 may also include various other commands, such as a GetWorkflowOutput command, which can receive a worflow ID and return the output of the workflow including a training dataset and labels (e.g., the labeled input dataset for that workflow) or a trained model. The API 500 may also include a GetLabelsForDatasetObject command which receives an object ID and returns all labels associated with that object. For example, an image file ID (e.g., a file name or other identifier) may be received by this command and all labels for that image may be returned. Similarly, a GetDatasetObjectsforLabel command can receive a label and return a list of all objects in the dataset that are associated with that specific label.

Figure 6:
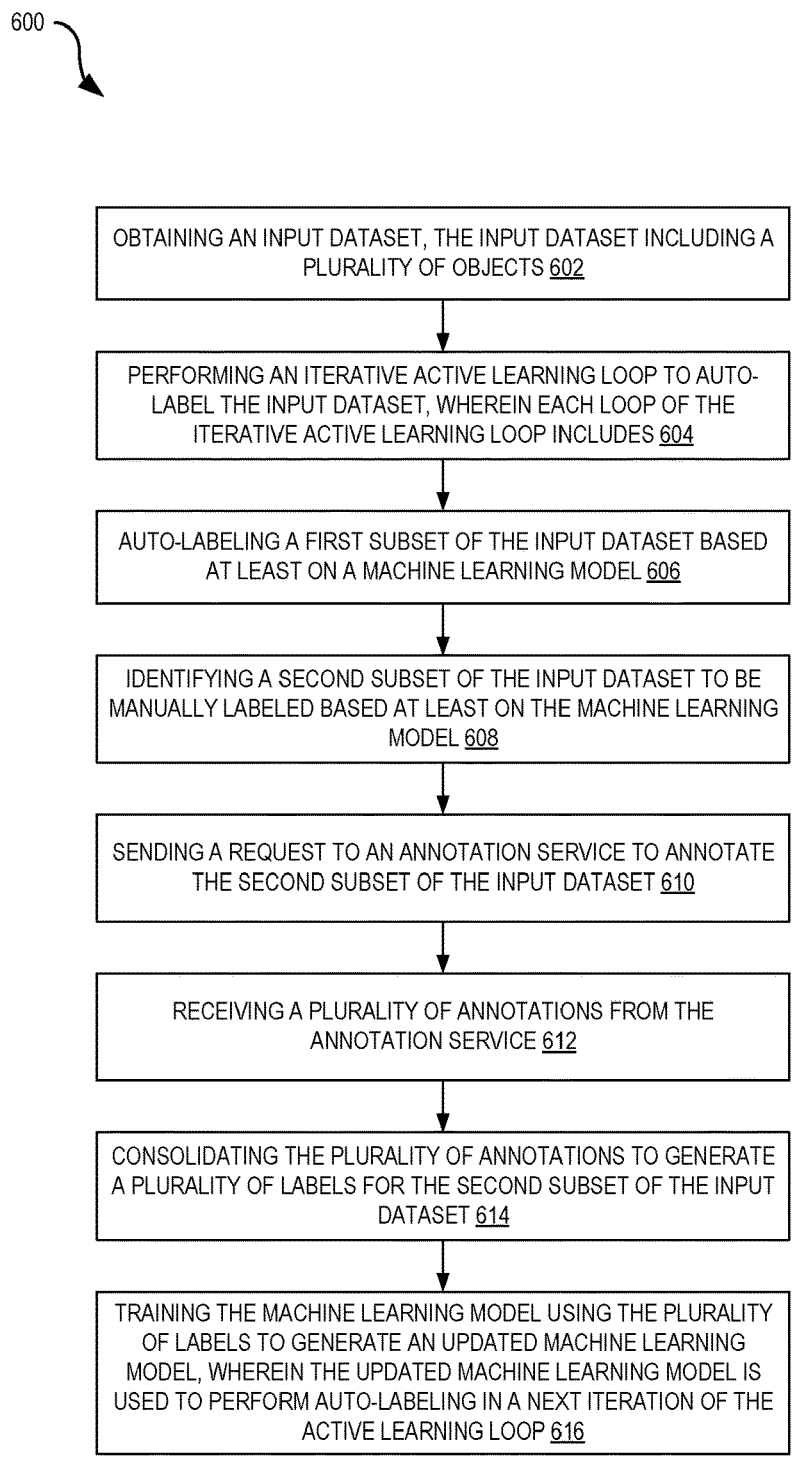
FIG. 6 is a flow diagram illustrating operations of a method for active learning-based data labeling according to some embodiments.

FIG. 6 is a flow diagram illustrating operations 600 of a method for active learning-based data labeling according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by data labeling service 108 of the other figures.

The operations 600 include, at block 602, receiving an input dataset, the input dataset including a plurality of objects. The operations 600 include, at block 604, performing an iterative active learning loop to auto-label the input dataset, wherein each loop of the iterative active learning loop includes each of the following operations shown in blocks 606-718. The operations 600 include, at block 606, auto-labeling a first subset of the input dataset based at least on a machine learning model.

The operations 600 include, at block 608, identifying a second subset of the input dataset to be manually labeled based at least on the machine learning model. In some embodiments, identifying the second subset may include identifying a plurality of objects in a validation dataset using the machine learning model, and selecting the subset of the input dataset having a confidence score lower than a threshold value. In some embodiments, the operations may further include generating a plurality of auto-annotations corresponding to the plurality of objects in the validation dataset using the machine learning model, determining a plurality of accuracy values for the plurality of auto-annotations for the validation dataset, performing regression on the accuracy of the plurality of auto-annotations to determine a confidence interval for each accuracy value, and determining the threshold value based on the confidence interval for a selected accuracy value.

The operations 600 include, at block 610, sending a request to an annotation service to annotate the second subset of the input dataset. In some embodiments, the annotation service comprises one or more of a machine annotation service, an internal annotation team, or an external annotation team. The operations 600 include, at block 612, receiving a plurality of annotations from the annotation service.

The operations 600 include, at block 614, consolidating the plurality of annotations to generate a plurality of labels for the second subset of the input dataset. In some embodiments, consolidating the plurality of annotations may include assigning a weight to each of the plurality of annotations, the weight based at least on an accuracy of an annotator associated with each of the plurality of annotations, combining the weights of each of the plurality of annotations for an object in the input dataset, and consolidating the plurality of annotations where the weights when combined are greater than a threshold weight.

The operations 600 include, at block 616, training the machine learning model using the plurality of labels to generate an updated machine learning model, wherein the updated detection model is used to perform auto-labeling of in a next iteration of the active learning loop. In some embodiments, next iteration of the active learning loop performs auto-labeling on a third subset of the input dataset that is larger than the first subset of the input dataset. In some embodiments, the operations further include returning at least one of the updated machine learning model or an output dataset, the output dataset labeled using the updated machine learning model.

In some embodiments, the operations may further include calculating a quality score associated with the plurality of labels, determining the quality score is less than a quality threshold, and requesting additional annotation of the subset of the input dataset from the annotation service. In some embodiments, requesting additional annotation may include requesting a number of annotators to perform the additional annotation, the number of annotators determined based at least on a difference between the quality score and the quality threshold.

In some embodiments, the operations may include receiving an input dataset, the input dataset including a plurality of image files, each image file depicting at least one object, performing an iterative active learning loop to auto-label at least one object in each of the plurality of image files, wherein each loop of the iterative active learning loop includes: auto-labeling a first subset of the plurality of image files based at least on an object detection model, identifying a second subset of the plurality of image files to be manually labeled based at least on the object detection model, sending a request to an annotation service to annotate the second subset of the plurality of images, receiving a plurality of annotations from the annotation service, consolidating the plurality of annotations to generate a plurality of labels for the second subset of the plurality of images, training the object detection model using the plurality of labels to generate an updated object detection model, wherein the updated detection model is used to perform auto-labeling in a next iteration of the active learning loop and storing an output dataset associated with the plurality of labels.

In some embodiments, the operations may include calculating a quality score for the plurality of labels, determining the quality score is below a quality threshold, and sending the subset of images to the annotation service to be manually annotated by a number of annotators determined based on a difference between the quality score and the quality threshold.

In some embodiments, receiving an input dataset may further include receiving a request to initiate a labeling workflow, the request including one or more of an address associated with the input dataset, a dataset type, and a quality threshold.

Figure 7:
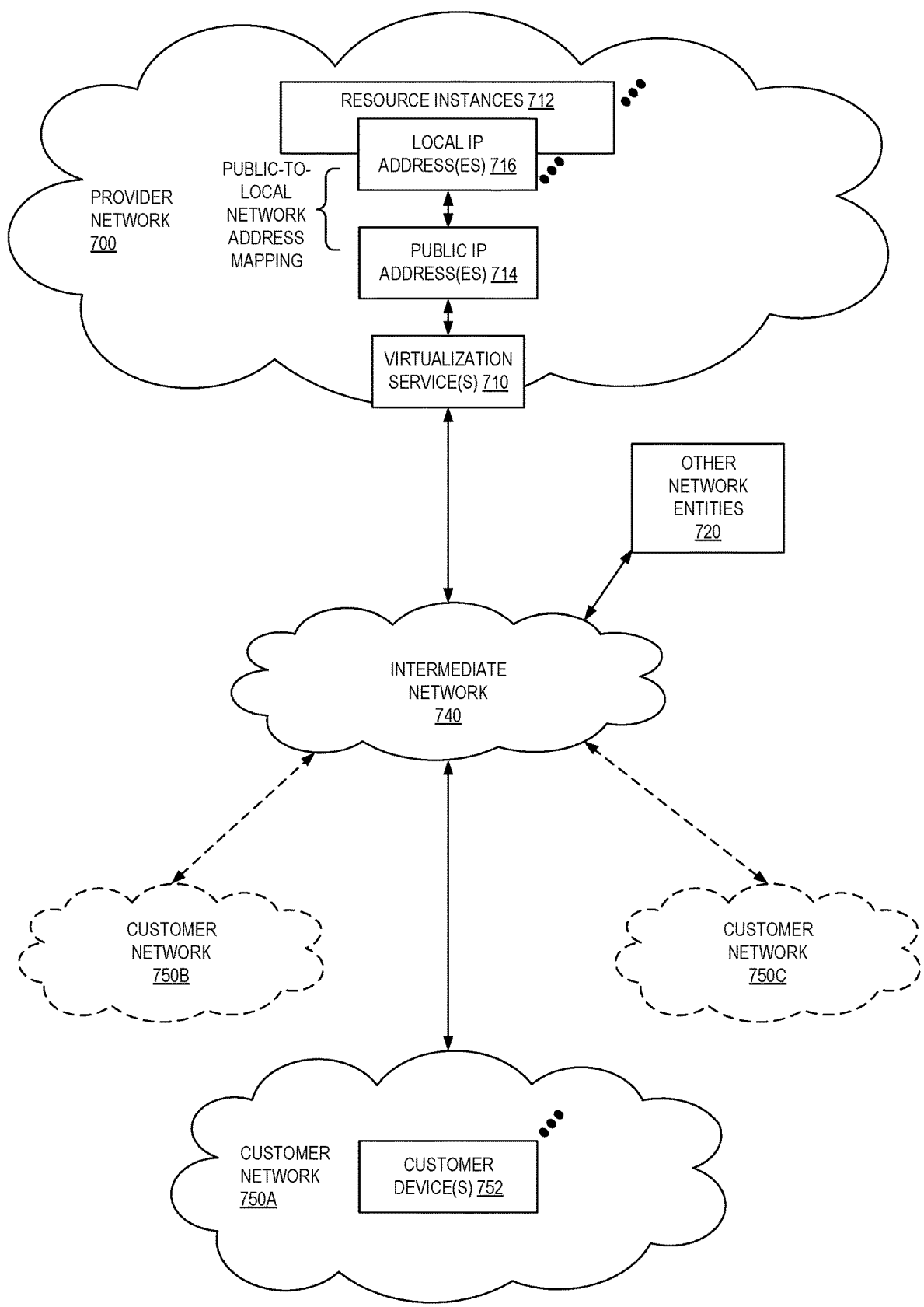
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 7 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
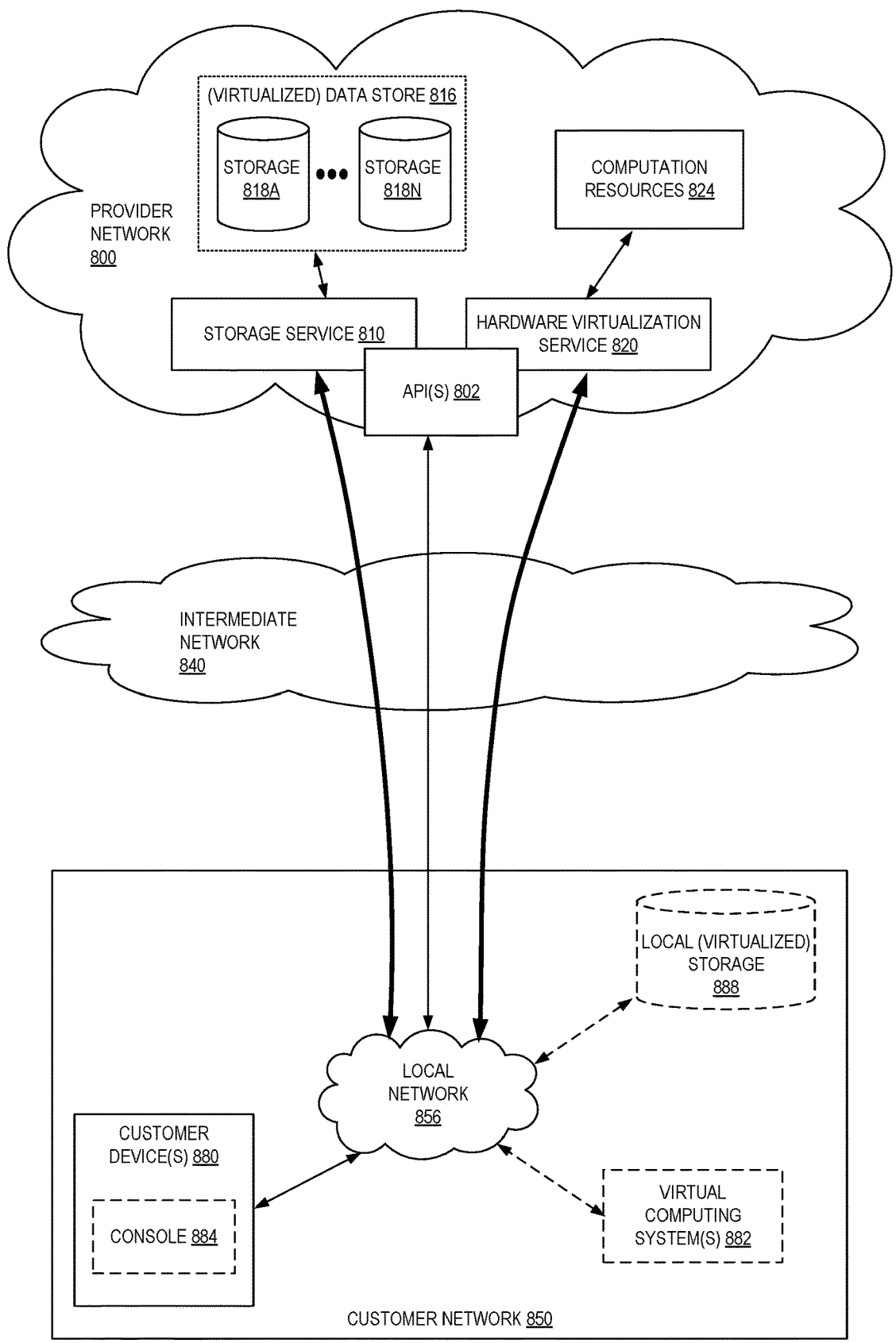
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
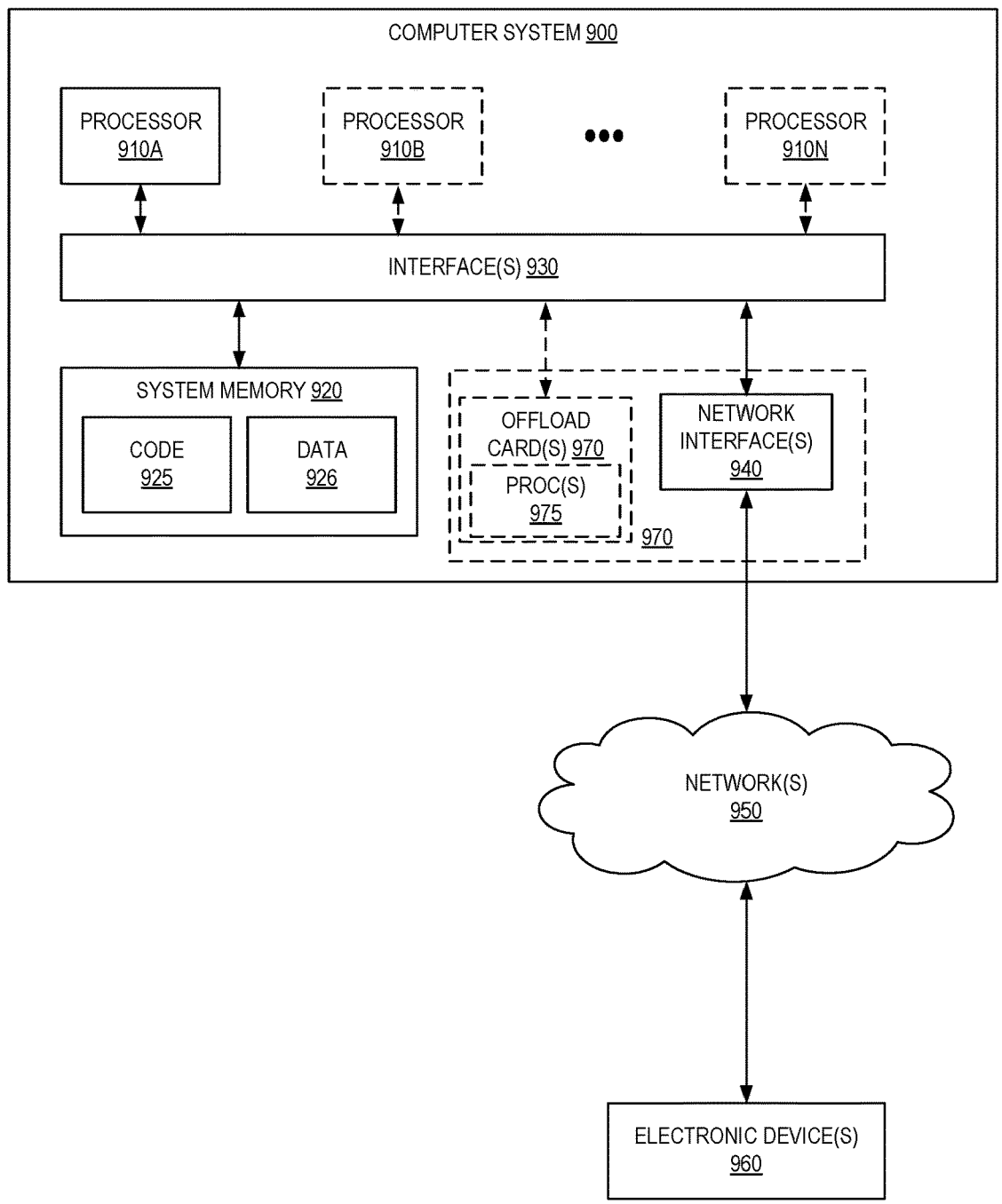
FIG. 9 is a block diagram illustrating an example computer system that may be used in some embodiments.

In some embodiments, a system that implements a portion or all of the techniques for active learning-based data labeling as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910

(e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a data labeling service implemented by at least one electronic device, an input dataset, the input dataset including a plurality of image files performing, by the data labeling service, an iterative active learning loop to auto-label each of the plurality of image files, wherein each loop of the iterative active learning loop includes:
  auto-labeling a first subset of the plurality of image files based at least on an object detection model;
  identifying a second subset of the plurality of image files to be manually labeled based at least on the object detection model;
  sending a request to an annotation service to annotate the second subset of the plurality of images;
  receiving a plurality of annotations from the annotation service;
  consolidating the plurality of annotations to generate a plurality of labels for the second subset of the plurality of images;
  training the object detection model using the plurality of labels to generate an updated object detection model, wherein the updated detection model is used to perform auto-labeling in a next iteration of the active learning loop; and
  storing an output dataset associated with the plurality of labels.

2. The computer-implemented method of claim 1, further comprising:
  calculating a quality score for the plurality of labels;
    determining the quality score is below a quality threshold; and
    sending the subset of images to the annotation service to be manually annotated by a number of annotators determined based on a difference between the quality score and the quality threshold.

3. The computer-implemented method of claim 1, wherein receiving an input dataset, the input dataset including a plurality of image files, each image file depicting at least one object further comprises:
  receiving a request to initiate a labeling workflow, the request including one or more of an address associated with the input dataset, a dataset type, and a quality threshold.

4. A computer-implemented method comprising:
  obtaining, by a data labeling service implemented by at least one electronic device, an input dataset, the input dataset including a plurality of objects;
  performing, by the data labeling service, an iterative active learning loop to auto-label the input dataset, wherein each loop of the iterative active learning loop includes:
    auto-labeling a first subset of the input dataset based at least on a machine learning model;
    identifying a second subset of the input dataset to be manually labeled based at least on the machine learning model;
    sending a request to an annotation service to annotate the second subset of the input dataset;
    receiving a plurality of annotations from the annotation service;
    consolidating the plurality of annotations to generate a plurality of labels for the second subset of the input dataset; and
    training the machine learning model using the plurality of labels to generate an updated machine learning model, wherein the updated machine learning model is used to perform auto-labeling in a next iteration of the active learning loop.

5. The computer-implemented method of claim 4, wherein the next iteration of the active learning loop performs auto-labeling on a third subset of the input dataset that is larger than the first subset of the input dataset.

6. The computer-implemented method of claim 4, further comprising:
  returning at least one of the updated machine learning model or an output dataset, the output dataset labeled using the updated machine learning model.

7. The computer-implemented method of claim 4, wherein identifying a second subset of the input dataset to be manually labeled based at least on the machine learning model, further comprises:
  identifying a plurality of objects in a validation dataset using the machine learning model; and
  selecting the subset of the input dataset having a confidence score lower than a threshold value.

8. The computer-implemented method of claim 7, further comprising:
  generating a plurality of auto-annotations corresponding to the plurality of objects in the validation dataset using the machine learning model;
  determining a plurality of accuracy values for the plurality of auto-annotations for the validation dataset;
  performing regression on the accuracy of the plurality of auto-annotations to determine a confidence interval for each accuracy value; and
  determining the threshold value based on the confidence interval for a selected accuracy value.

9. The computer-implemented method of claim 4, wherein the annotation service comprises one or more of a machine annotation service, an internal annotation team, or an external annotation team.

10. The computer-implemented method of claim 4, wherein consolidating the plurality of annotations to generate a plurality of labels for the second subset of the input dataset, further comprises:
  assigning a weight to each of the plurality of annotations, the weight based at least on an accuracy of an annotator associated with each of the plurality of annotations;
  combining the weights of each of the plurality of annotations for an object in the input dataset; and
  consolidating the plurality of annotations where the weights when combined are greater than a threshold weight.

11. The computer-implemented method of claim 4, further comprising:
  calculating a quality score associated with the plurality of labels;
  determining the quality score is less than a quality threshold; and
  requesting additional annotation of the subset of the input dataset from the annotation service.

12. The computer-implemented method of claim 11, wherein requesting additional annotation of the subset of the input dataset from the annotation service, further comprises:
  requesting a number of annotators to perform the additional annotation, the number of annotators determined based at least on a difference between the quality score and the quality threshold.

13. A system comprising:
  an input dataset in an instance of a storage service implemented by a first one or more electronic devices; and
  a data labeling service implemented by a second one or more electronic devices, the data labeling service including instructions that upon execution cause the data labeling service to:

receive an input dataset, the input dataset including a plurality of objects;

perform an iterative active learning loop to auto-label the input dataset, wherein in each loop of the iterative active learning loop the instructions, when executed, further cause the data labeling service to:

auto-label a first subset of the input dataset based at least on a machine learning model;

identify a second subset of the input dataset to be manually labeled based at least on the machine learning model;

send a request to an annotation service to annotate the second subset of the input dataset;

receive a plurality of annotations from the annotation service;

consolidate the plurality of annotations to generate a plurality of labels for the second subset of the input dataset; and train the machine learning model using the plurality of labels to generate an updated machine learning model, wherein the updated machine learning model is used to perform auto-labeling in a next iteration of the active learning loop.

14. The system of claim 13, wherein the next iteration of the active learning loop performs auto-labeling on a third subset of the input dataset that is larger than the first subset of the input dataset.

15. The system of claim 14, wherein the instructions, when executed, further cause the data labeling service to:

calculate a quality score associated with the plurality of labels;

determine the quality score is less than a quality threshold; and request a number of annotators to perform the additional annotation, the number of annotators determined based at least on a difference between the quality score and the quality threshold.

16. The system of claim 13, wherein the instructions, when executed, further cause the data labeling service to:

return at least one of the updated machine learning model or an output dataset, the output dataset labeled using the updated machine learning model.

17. The system of claim 13, wherein to identify a second subset of the input dataset to be manually labeled based at least on the machine learning model, the instructions, when executed, further cause the data labeling service to:

identify a plurality of objects in a validation dataset using the machine learning model; and select the subset of the input dataset having a confidence score lower than a threshold value.

18. The system of claim 17, wherein the instructions, when executed, further cause the data labeling service to:

generate a plurality of auto-annotations corresponding to the plurality of objects in the validation dataset using the machine learning model;

determine a plurality of accuracy values for the plurality of auto-annotations for the validation dataset;

perform regression on the accuracy of the plurality of auto-annotations to determine a confidence interval for each accuracy value; and determine the threshold value based on the confidence interval for a selected accuracy value.

19. The system of claim 13, wherein the annotation service comprises one or more of a machine annotation service, an internal annotation team, or an external annotation team.

20. The system of claim 13, wherein to consolidate the plurality of annotations to generate a plurality of labels for the second subset of the input dataset, the instructions, when executed, further cause the data labeling service to:

assign a weight to each of the plurality of annotations, the weight based at least on an accuracy of an annotator associated with each of the plurality of annotations;

combining the weights of each of the plurality of annotations for an object in the input dataset; and consolidating the plurality of annotations where the weights when combined are greater than a threshold weight.

* * * * *